United States Patent [19]
Kawata

[11] Patent Number: 5,467,203
[45] Date of Patent: Nov. 14, 1995

[54] FACSIMILE MACHINE

[75] Inventor: Kenji Kawata, Uji, Japan

[73] Assignee: Murata Kikai Kabushiki Kaisha, Kyoto, Japan

[21] Appl. No.: 936,948

[22] Filed: Aug. 28, 1992

[30] Foreign Application Priority Data

Aug. 29, 1991 [JP] Japan .................................. 3-244880

[51] Int. Cl.$^6$ .................................................. H04N 1/46
[52] U.S. Cl. ........................... 358/451; 358/405; 358/444; 358/449
[58] Field of Search ..................... 358/451, 449, 358/405, 296, 287, 452, 444, 404; 382/47

[56] References Cited

U.S. PATENT DOCUMENTS

| | | | |
|---|---|---|---|
| 4,528,693 | 9/1982 | Pearson | 382/47 |
| 4,610,026 | 4/1983 | Tabata | 382/47 |
| 4,695,898 | 9/1987 | Ishikawa | 358/298 |
| 4,731,658 | 4/1988 | Koseki | 358/287 |
| 4,809,083 | 2/1989 | Nagano | 358/287 |
| 4,814,893 | 6/1989 | Katoh | 358/296 |
| 5,053,885 | 10/1991 | Telle | 358/449 |
| 5,057,937 | 10/1991 | Muramatsu | 358/405 |
| 5,126,858 | 6/1992 | Kurogane | 358/450 |
| 5,345,318 | 9/1994 | Seo | 358/449 |

*Primary Examiner*—Sandra L. O'Shea
*Assistant Examiner*—John Ning
*Attorney, Agent, or Firm*—Spensley Horn Jubas & Lubitz

[57] ABSTRACT

As image data is received by the facsimile machine, it is stored in the form of plural lines. A line which contains black pixels more than a predetermined number is taken as a drawing line (image-carrying line or effective line). All the image data lines are scanned from the top to the bottom to find a top image-carrying line or top effective line and a bottom image-carrying line or bottom effective line and the number of the lines from the top effective line to the bottom effective line is calculated as the number of the effective lines of sending sheet. If the number of the effective lines of the sending sheet exceeds the number of recording lines of a recording sheet, the image data is reduced with a reduction ratio which is determined by the number of the recording lines and the number of the effective lines.

6 Claims, 14 Drawing Sheets

FIG. 3(a) REDUCTION RATIO 100%
FIG. 3(b) REDUCTION RATIO 87.5%
FIG. 3(c) REDUCTION RATIO 75%

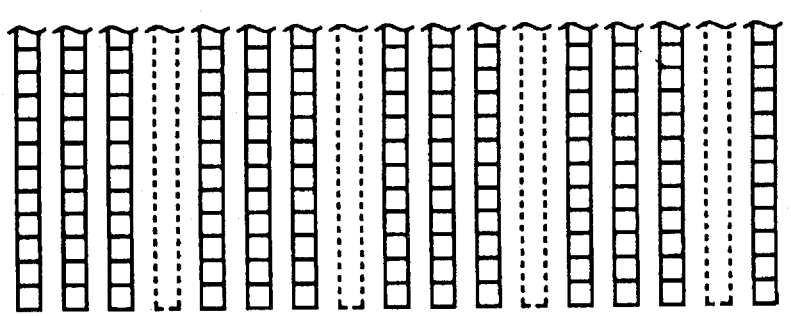
FIG. 4(c) REDUCTION RATIO 75%
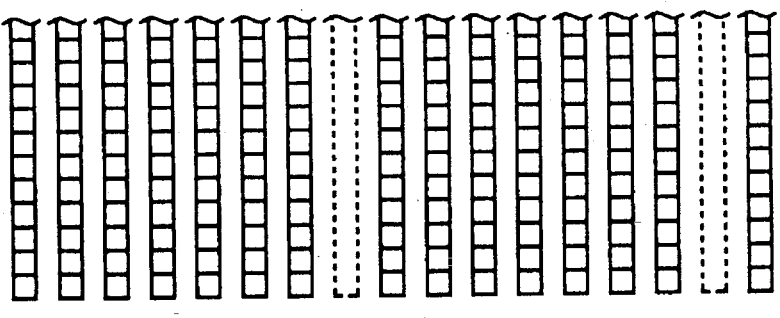
FIG. 4(b) REDUCTION RATIO 87.5%
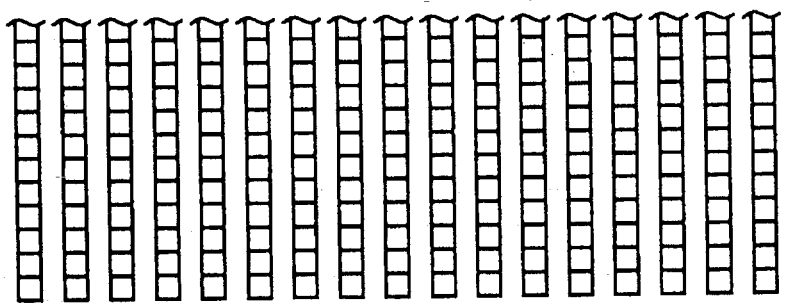
FIG. 4(a) REDUCTION RATIO 100%

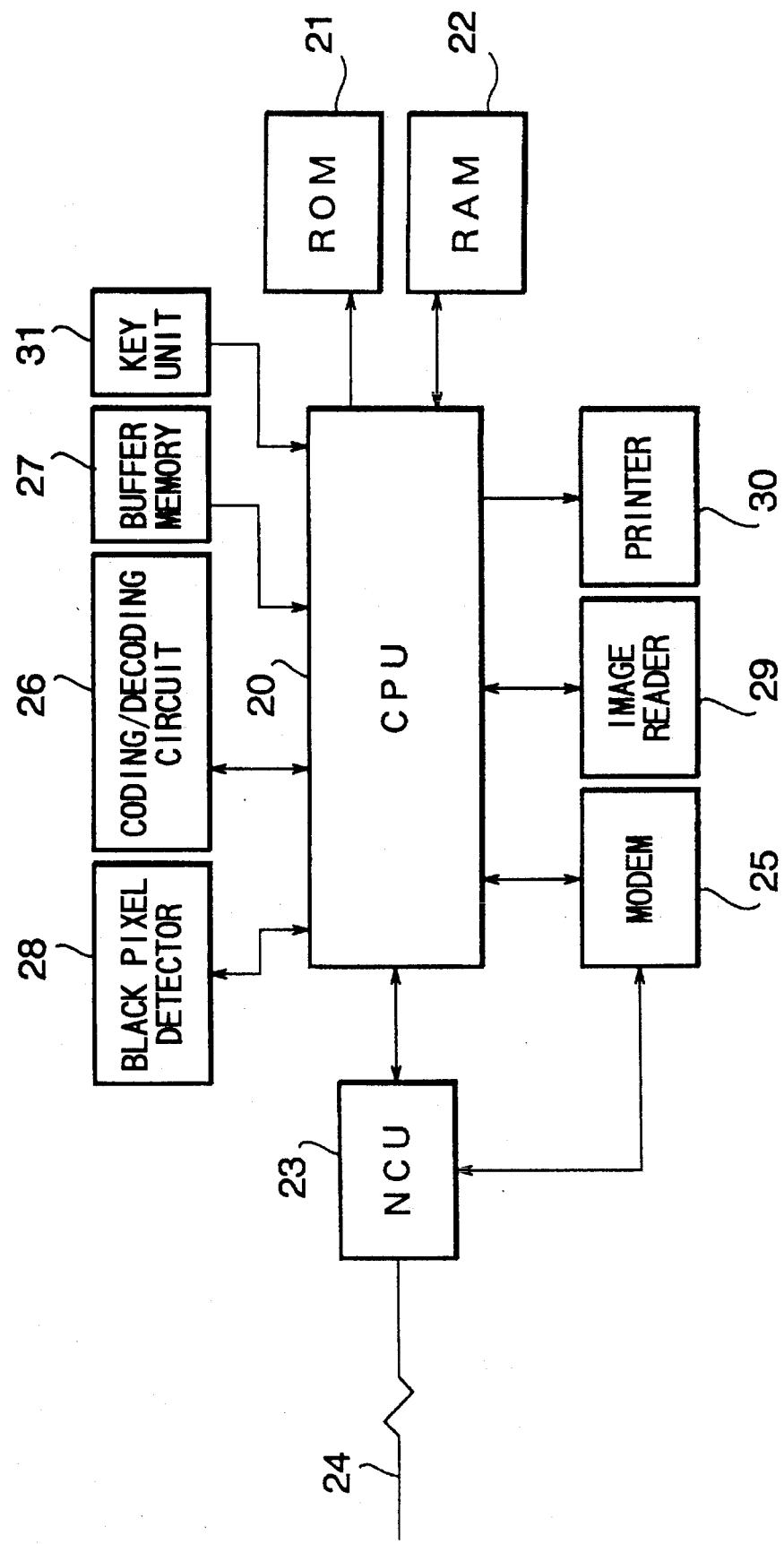

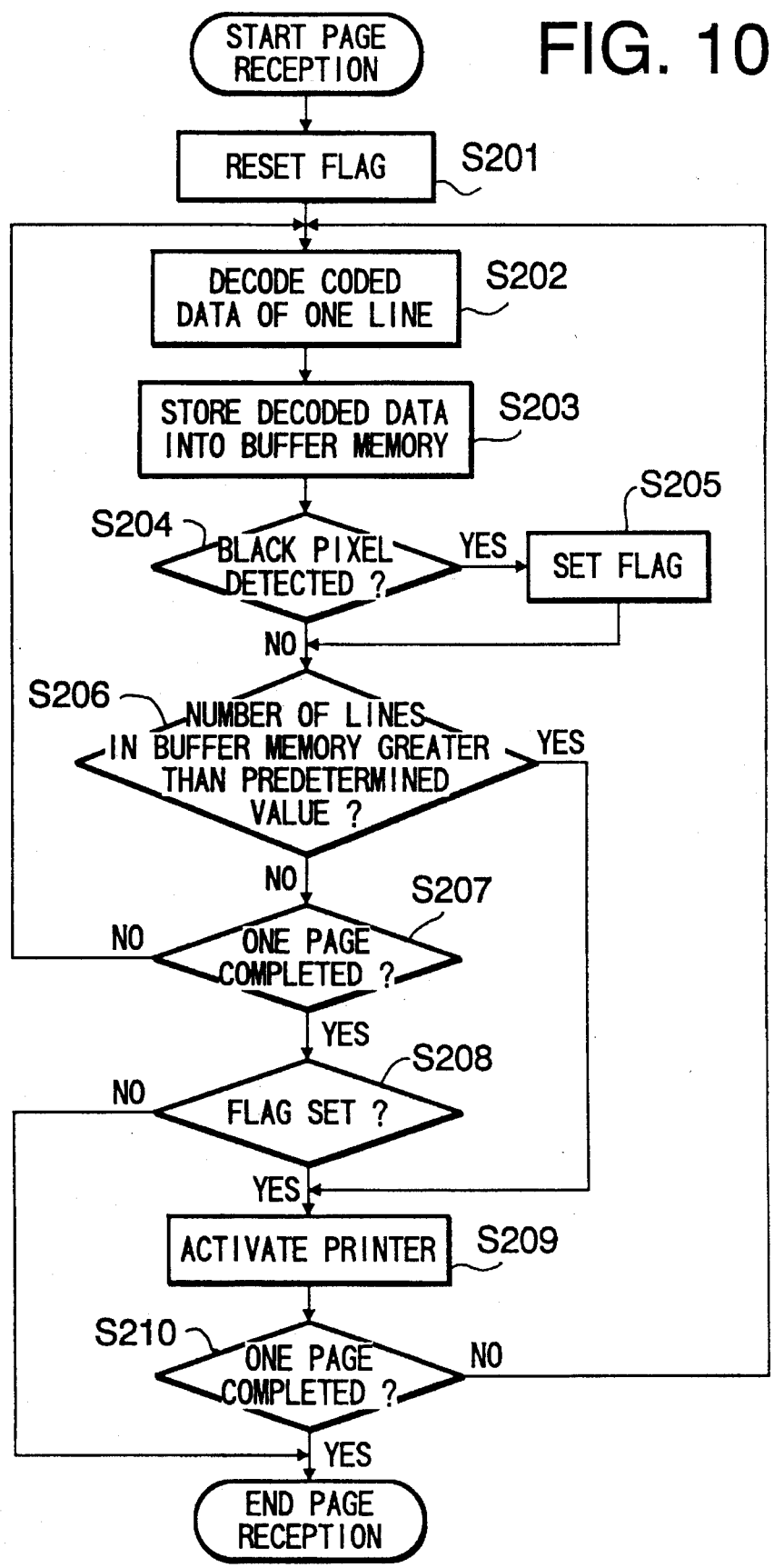

FACSIMILE MACHINE

BACKGROUND OF THE INVENTION

1. Technical Field

The present invention relates to an improvement of facsimile machine and particularly to a facsimile machine which can reduce the image data as small as possible such that even a large volume of image data can be printed on a single recording sheet of standard size.

2. Background Art

Facsimile machines which use recording sheets of predetermined size or standard size paper such as A4 or B4 size paper, instead of a roll of thermosensitive paper, are developed and used in recent years. Referring to FIG. 7 of the accompanying drawings, when this type of facsimile machine is used to transmit image data D1 drawn on a sending sheet T100 of A4 size to another facsimile machine 200 from a facsimile machine 100 through a telephone line L, various pieces of information are added to the image data D1 before the image data D1 reaches another facsimile machine 200. Such various pieces of information may be company name, telephone number, facsimile number and ID code of the sending side. Upon receiving the image data D1 and accompanying piece of information P, the receiving side facsimile 200 prints the image data D1 and accompanying information P on a recording sheet R100.

However, since the receiving side facsimile machine 200 uses the fixed size paper (A4 size paper), it cannot print the image data over the A4 size. Further, since the accompanying information P should be printed on the same sheet, a certain margin is necessary in the A4 size sheet. Accordingly, when the sending sheet T100', all the space of which is occupied by the image data D2, is sent from the facsimile machine 100, the data transmitted from the facsimile machine 100 (D2 and P) are not completely printed on a single sheet of paper R100'. As a result, the information P and part of the image data D2' are printed on the first sheet R100' and the rest of image data D2" is printed on the second sheet R101' with the information P. This occurs regardless of the volume of remaining data D2". Specifically, even if tile remaining data D2" has only a volume of one line, two sheets are required to print all the data from the facsimile machine 100. In this case, an operator of the receiving side facsimile machine 200 should see two sheets of paper to grasp the data sent from the sending side facsimile machine 100 and the consumption of the recording sheets increases accordingly. Of course, if the sheet on the sending side is larger (or longer) than the A4 size sheet, two A4 size sheets are required on the receiving side.

Regarding these shortcomings, developed is a facsimile machine which can reduce the size of image data, as shown in FIG. 8(a) of the accompanying drawings. With this type of facsimile machine, the number of lines (A) of the sending sheet is counted and the number of lines (B) of the recording sheet is memorized. Then, the number B is divided by the number A and the resultant is taken as the reduction ratio. The image data to be sent is reduced with this reduction ratio and such a reduced image data is printed on the recording sheet, as shown in FIG. 8(a). According to this type of facsimile machine, it is possible to print on a single sheet of paper all the data sent from the sending side facsimile machine, regardless of the length of the sending sheet.

However, with the above described facsimile machine, the number of the lines of the sending sheet is counted, but the number of lines for the image data drawn on the sending sheet is not counted. In other words, the number A is determined by the length of the sending sheet, independently of the length of the image data. Therefore, even if the lower part of the sending sheet is blank, the image data on the sending sheet is always reduced with the reduction ratio of B/A, as shown in FIG. 8(b). In this case, the image data is unnecessarily reduced and the image information may be deteriorated when it is printed on the receiving sheet.

Referring now to FIG. 11 of the accompanying drawings, which shows another conventional example, when the image data is transmitted from the facsimile machine to another facsimile machine with the information of sending party 13 (sending party's name, date, time and so on), the image data is printed on the receiving sheet Y with various pieces of information 13. In this case, the sending party's information 18 is printed in the top portion L of the receiving (or recording) sheet Y and the image data is printed therebelow. In other words, the image data is shifted downward by the length L in the sub scanning direction when it is printed on the recording sheet Y. If the end of the image data protrudes from the end of the recording sheet Y and the recording sheet Y is a cut sheet of standard size, the protruding portion is printed on the next sheet.

In many cases, nothing is written in the lower portion of the sending sheet and nothing is printed on the second sheet on the receiving side. (Only the information 18 is printed on the top line of the second recording sheet.) This wastes the recording sheets.

SUMMARY OF THE INVENTION

The present invention is devised to eliminate the above-described problems and its primary object is to provide a facsimile machine which has a signal processor to perform a novel scale down printing. To achieve this object, a line which contains black pixels more than a predetermined number is taken as a drawing line (image-carrying line), and the number of the drawing lines (image-carrying lines) on a single sheet (sending sheet) is calculated as the number of the effective lines of sending sheet. If the number of the effective lines of the sending sheet exceeds the number of recording lines of the recording sheet, the image data is reduced with a reduction ratio which is determined by the number of the recording lines and the number of the effective lines. This scale down process is conducted by the signal processor. On the other hand, if the number of the effective lines of the sending sheet does not exceed the number of recording lines of the recording sheet, the image data is printed in its full scale. Therefore, unnecessary reduction does not take place and a certain information may become blurred because of the reduction. In such a case, the image data on the sending sheet is completely transferred onto the recording sheet.

The predetermined number of the black pixels may be determined such that even if some black pixels (noises) intermix with white pixels in a line, such a line is not counted as the drawing line (image-carrying line).

Another object of the present invention is to provide a facsimile machine which can perform a scale down printing with the reduction ratio being printed on the recording sheet.

Still another object of the present invention is to provide a facsimile machine which includes means for receiving image data, means for performing the printing on a recording sheet based on the received image data, means for detecting black pixels of the image data, and control means for deactivating the printing means if the number of the image data lines which are not printed yet is not greater than a predetermined value and the black pixel data is not detected in the remaining image data lines.

Yet another object of the present invention is to provide a facsimile machine which does not unnecessarily print onto the recording sheet white pixels of the sending sheet. Specifically, since no sentences or no illustrations are drawn in a lower part of the sending sheet in many cases, the printing of such a lower part is unnecessary on the receiving side. Thus, if the number of the image data lines which are not printed yet is smaller than a predetermined value and the black pixel data is not detected in the remaining image data lines, the printing operation is stopped. Consequently, a blank (or white) recording sheet is not fed out of the facsimile machine.

These and other aspects, objects and advantages of the present invention will be understood from a following detailed description as read with the accompanying drawings and appended claims.

BRIEF DESCRIPTION OF THE DRAWINGS

FIGS. 3(a)–3(c) conceptually show the thinning out process in the main scanning direction, respectively;

FIGS. 4(a)–4(c) conceptually show the thinning out process in the sub scanning direction, respectively;

FIG. 9 is a block diagram of a facsimile machine according to a second embodiment of the present invention;

FIG. 10 is a flow chart of the facsimile machine of FIG. 9;

DETAILED DESCRIPTION OF THE PREFERRED EMBODIMENTS

Now, preferred embodiments of the present invention will be described in reference to the accompanying drawings.

One embodiment will be explained with reference to FIGS. 1–6.

Figure 1:
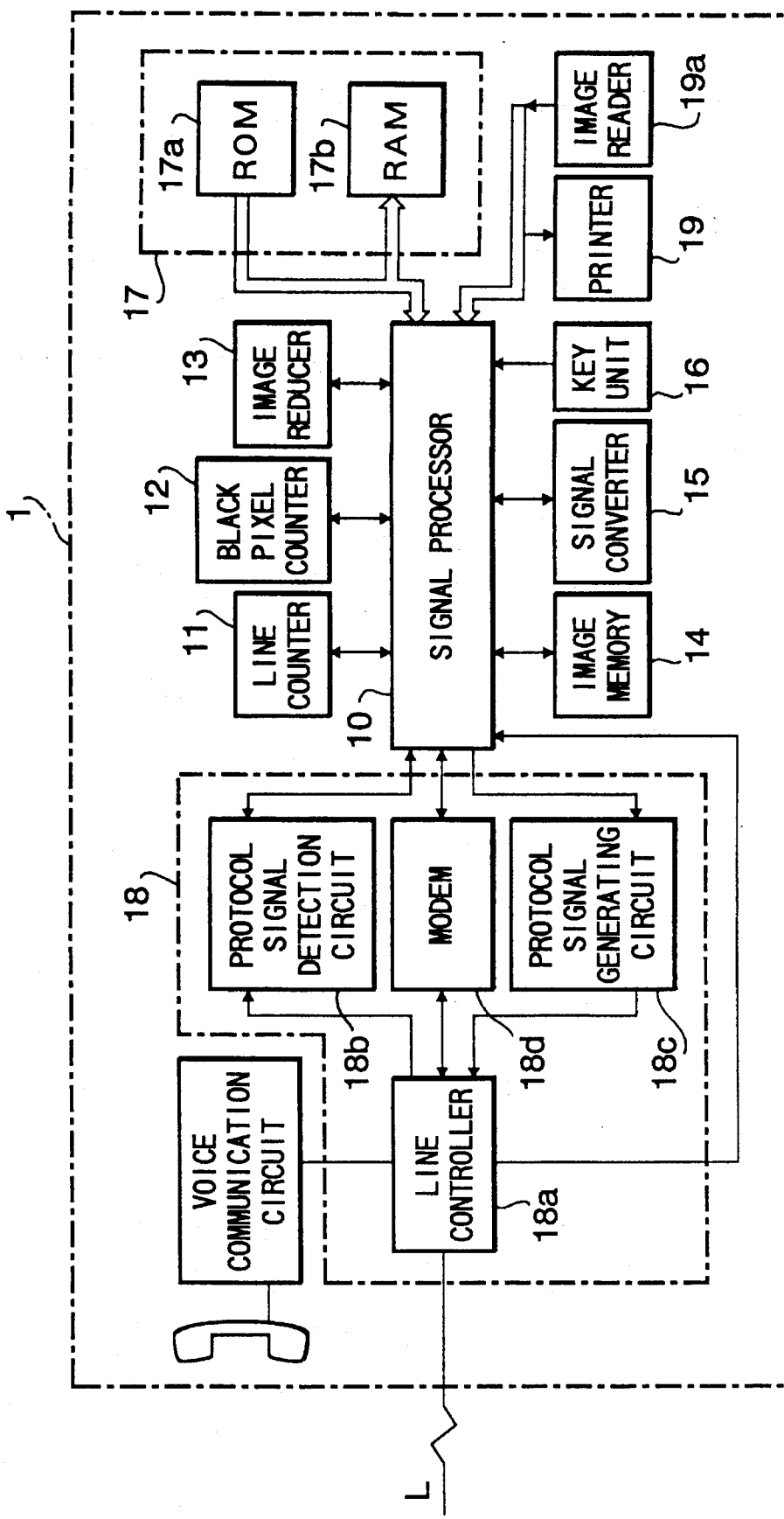
FIG. 1 is a block diagram shows an internal structure of a facsimile machine according to one embodiment of the present invention.

Illustrated in FIG. 1 is a block diagram of a facsimile machine 1 according to the present invention. In this illustration, numeral 10 designates a signal processor for processing various signals of pieces of component of the facsimile machine 1, 11 designates a line counter for counting the number of lines of image data, 12 designates a black pixel counter for counting the number of black pixels (black image elements) in each line, 13 designates an image reducing device for reducing the image data by a "thinning out" process (to be described later), 14 designates an image memory for temporarily storing the image data received by the facsimile machine 1, 15 designates a signal converter for coding the image data and decoding the coded image data and 16 designates a key unit having various kinds of operation keys (not shown). Further, numeral 17 designates a system memory which is comprised of a ROM 17a and a RAM 17b, 18 designates a transmission/reception controller, 19 designates a printer for printing the image data on the recoding sheet and 19a designates an image reader.

Figure 2:
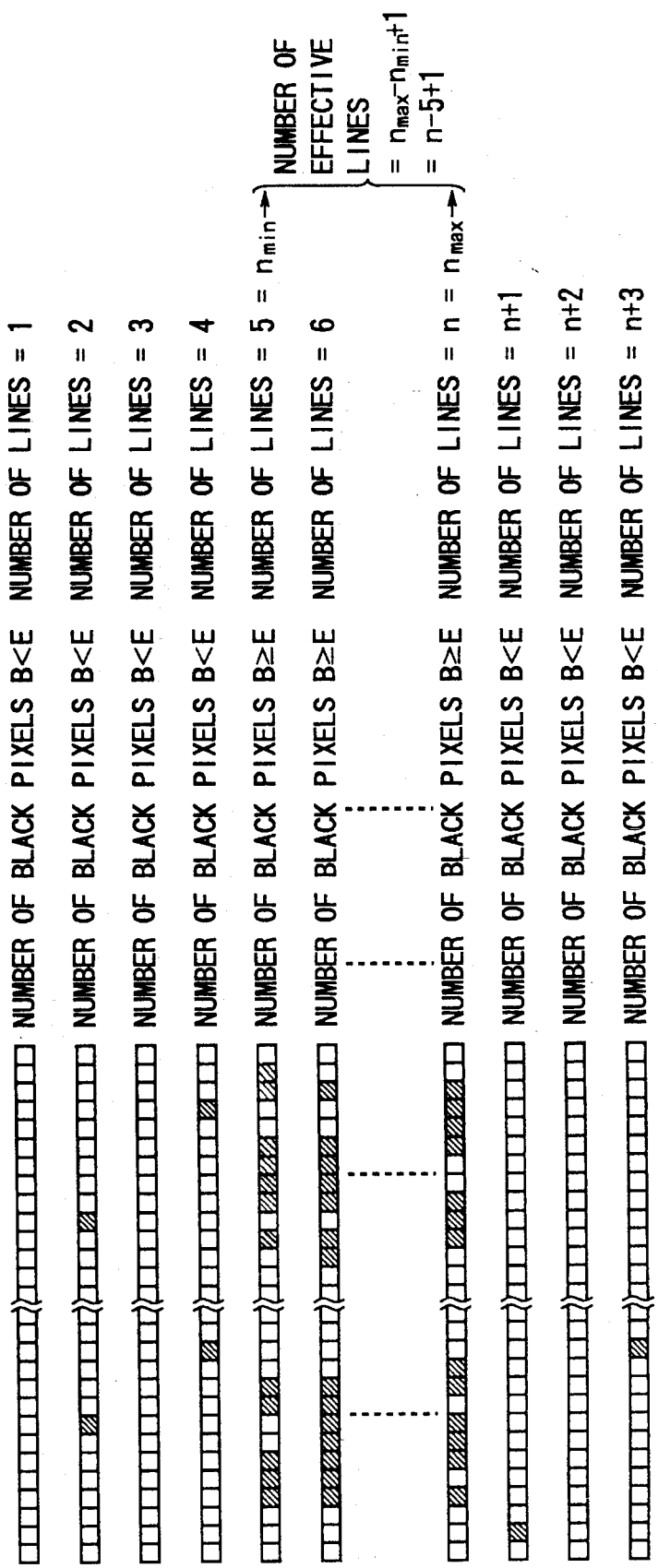
FIG. 2 illustrates how a number of effective lines are calculated in the facsimile machine of FIG. 1.

Referring to FIG. 2, the black pixel counter 12 counts the number of black pixels (B) in each line of the image data. As will be described later, the signal processor 10 judges whether or not the number B exceeds a predetermined number E. The line which has black pixels more than the predetermined number E is referred to as "image-carrying line".

The image reduction device 13 carries out the thinning out process to obtain the scale down image data. With respect to the thinning out process in the main scanning direction (width direction of the drawing sheet), if the reduction ratio is 100%, the scale down operation is not carried out, as shown in FIG. 3(a). If the reduction ratio is 87.5%, one pixel is thinned out for every eight pixels (FIG. 3(b)), and if the reduction ratio is 75%, one pixel is thinned out for every four pixels (FIG. 3(c)). With respect to the sub scanning direction (height direction of the drawing sheet), when the reduction ratio is 100%, no thinning out takes place, as shown in FIG. 4(a). If the reduction ratio is 87.5%, image data of one line is thinned out for every eight lines as indicated by the broken lines in FIG. 4(b), and if the reduction ratio is 75%, image data of one line is thinned out for every four lines as indicated by the broken line in FIG. 4(c). The scale down of the image data is performed in the above described manner.

The signal converter 15 codes the image data, which is read from the sending sheet with the image reader 19a, into a MH coded data or a MR coded data and/or decodes the coded image data, which may be transmitted from another facsimile machine, into its original form.

The signal transmission/reception controller 18 includes a line controller 18a, a protocol signal detecting circuit 18b, a protocol signal generating circuit 18c and a modem 18d. The line controller 18a performs an automatic line connection with the telephone line L when it detects a calling signal. The protocol signal detecting circuit 18b detects a protocol signal transmitted from another facsimile machine to start an ordinary facsimile transmission operation. The protocol signal generating circuit 18c generates a protocol signal necessary to execute the facsimile transmission with another facsimile machine. The modem 18d receives a modulated image data from another facsimile machine and demodulates it, and/or modulates the image data and sends it to the other facsimile machine.

Figure 5A:
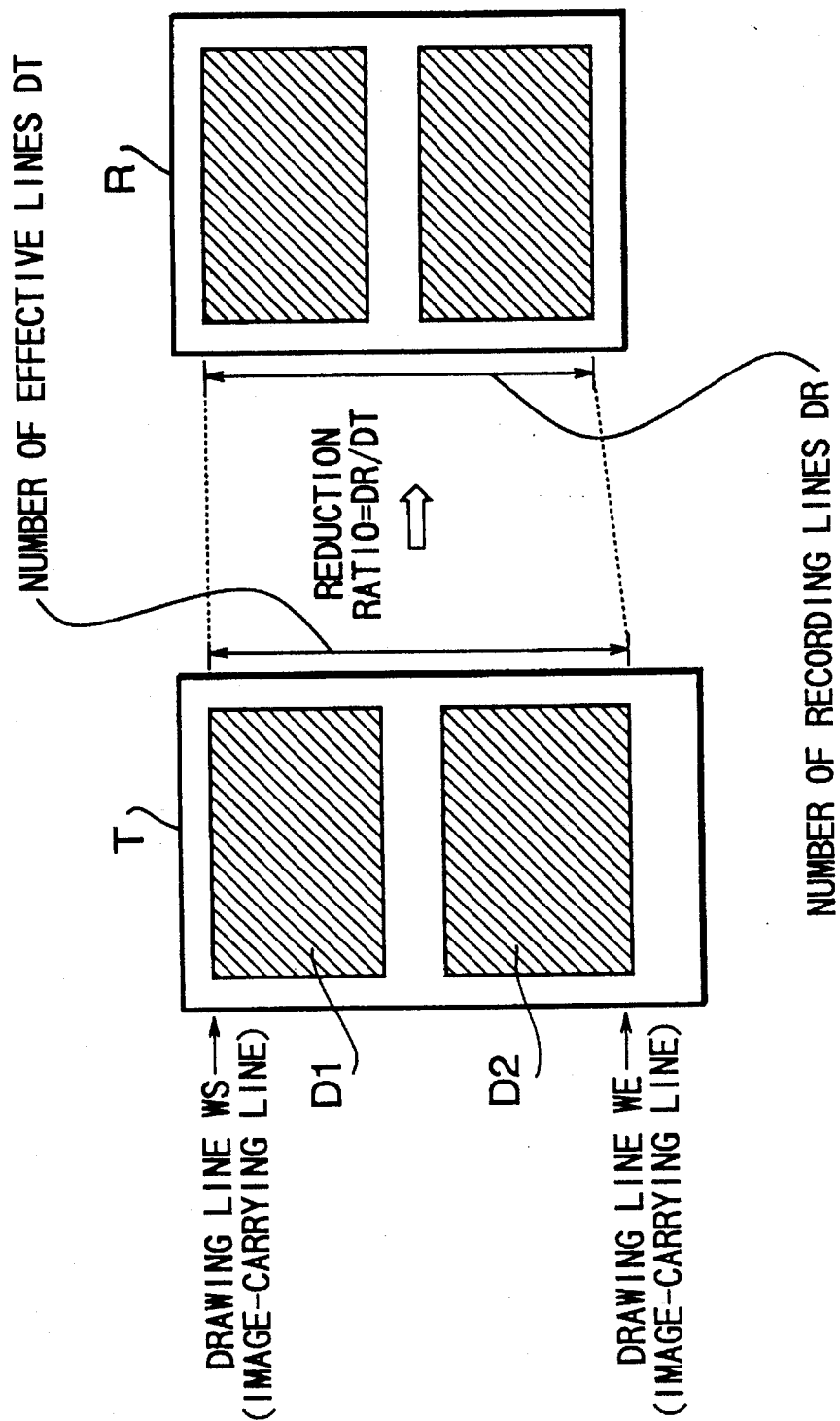
FIGS. 5(a) and 5(b) conceptually show the operation of the facsimile machine of FIG. 1, respectively.
Figure 5B:
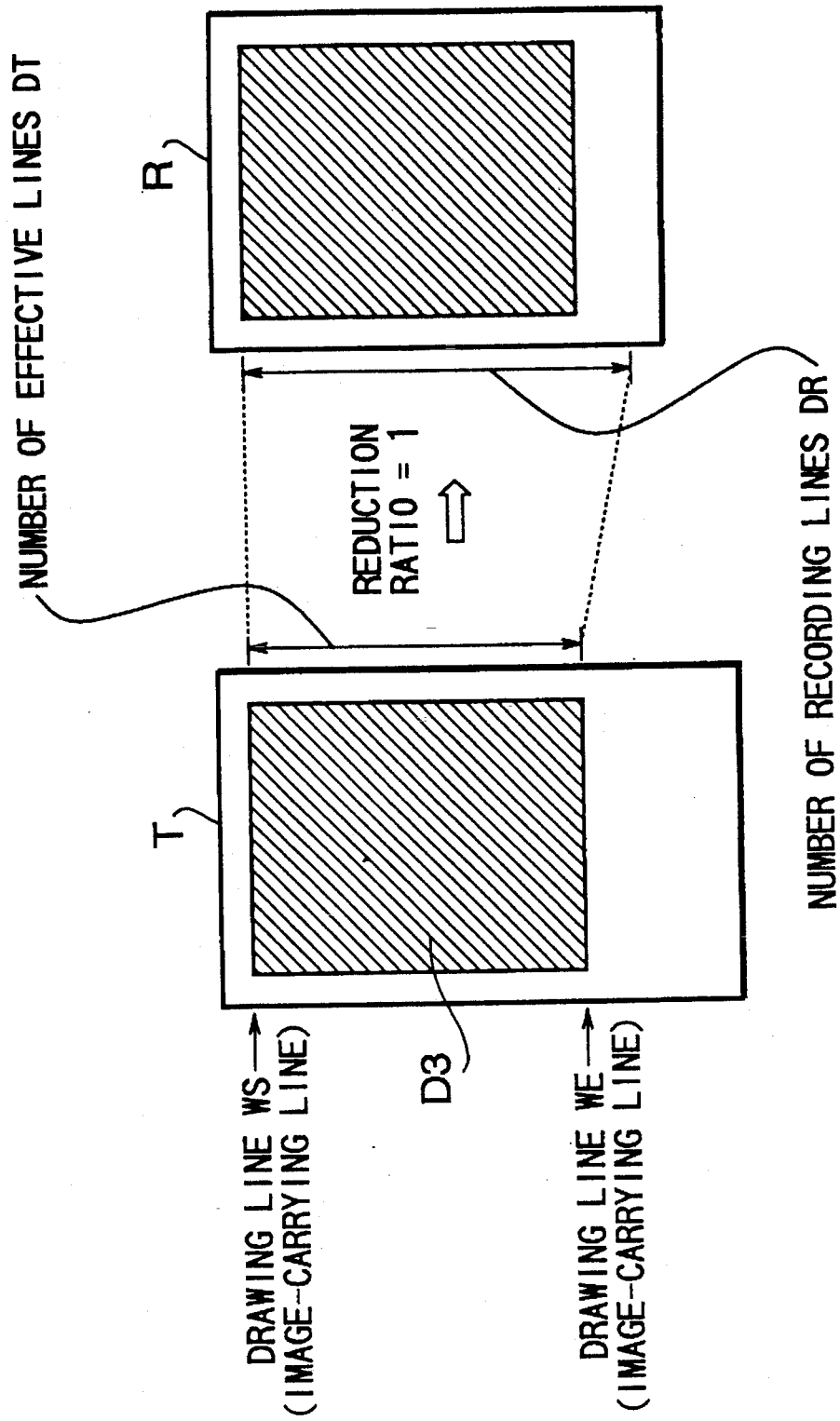

FIGS. 5(a) and 5(b) schematically show the printing operation performed by the above described facsimile machine 1. FIG. 5(a) shows a case where the image data D1 and D2 are depicted on the sending sheet T. The first image-carrying line (or top effective line) WS of the image data D1 and the last image-carrying line (or bottom effective line) WE of the image data D2 are detected to calculate the number of effective lines DT (DT=WE−WS+1). (+2 or another value may be selected instead of +1.) If the resulting number DT exceeds the number of lines of the recording sheet (standard size sheet) (DR), the number DR is divided by the number DT and the outcome is used as the reduction ratio. This reduction ratio is also printed on the recording sheet.

Referring to FIG. 5(b), if the number of effective lines of the image data D8 depicted on the sending sheet T (DT) is smaller than the number of lines of the recording sheet (DR), no scale down process takes place and the image data of full scale is printed on the recording sheet.

Figure 6:
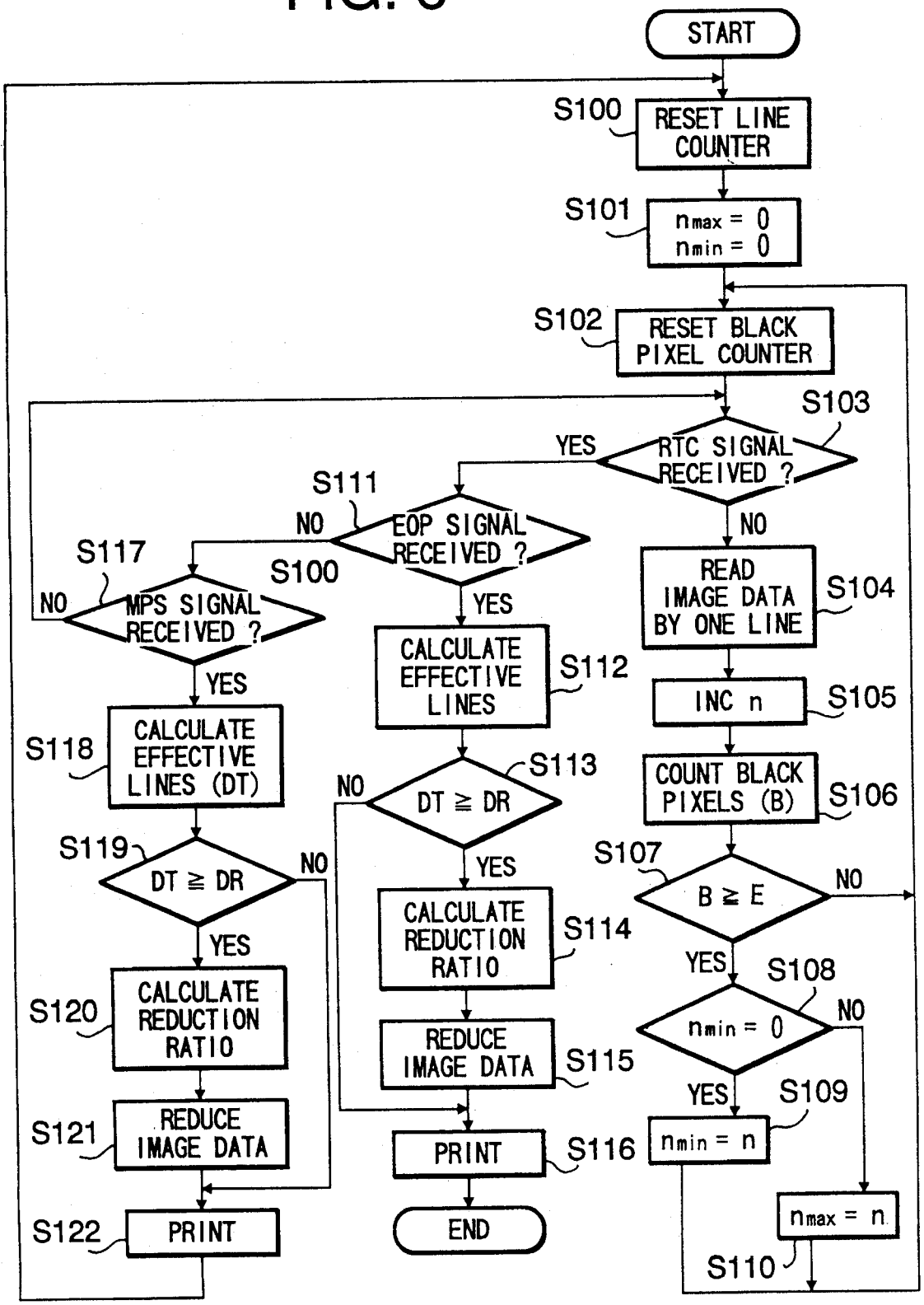
FIG. 6 is a flow chart to explain the operation of the facsimile machine illustrated in FIG. 1.
Figure 7:
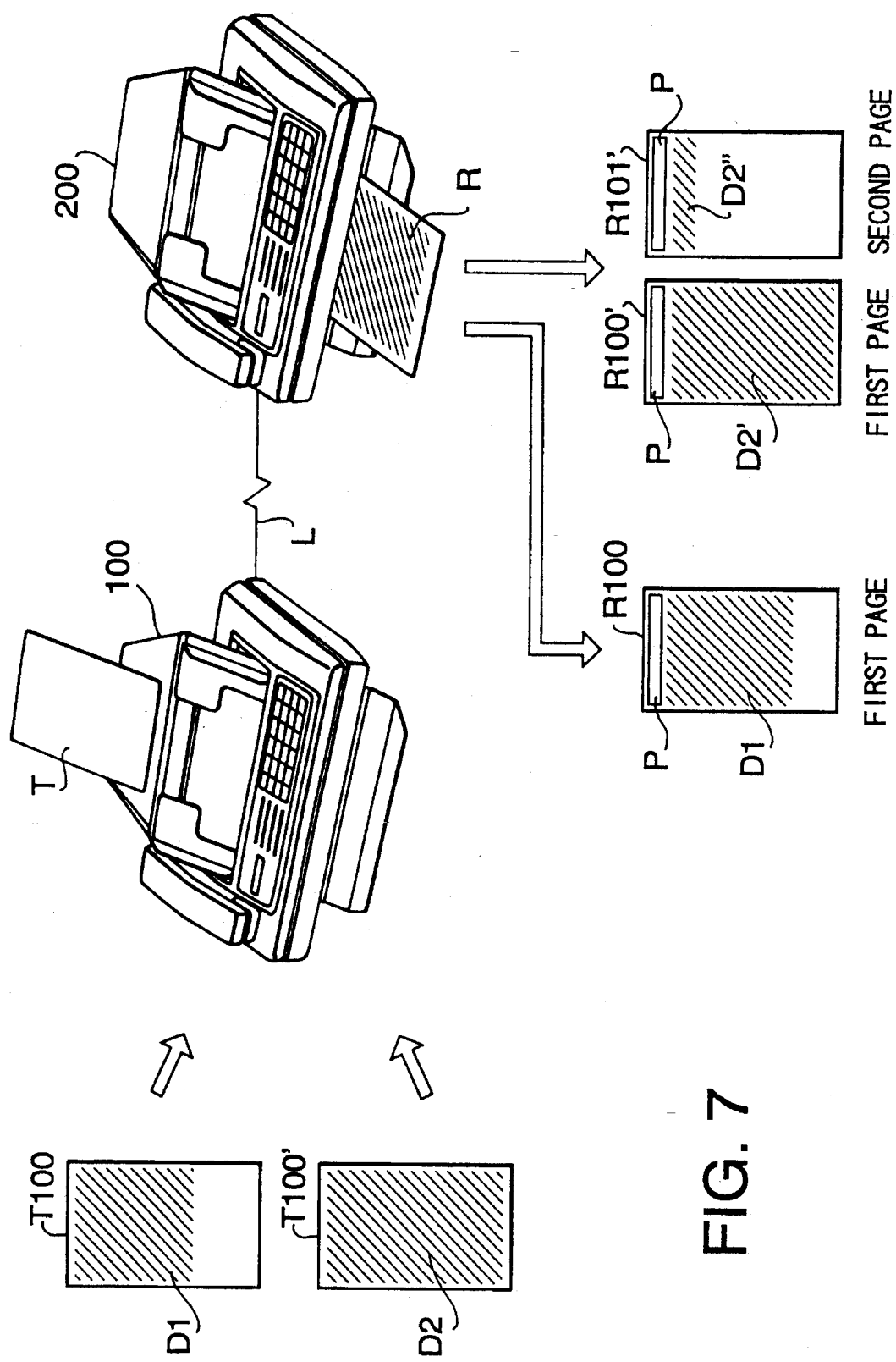
FIG. 7 illustrates the data transmission between two conventional facsimile machines.
Figure 8A:
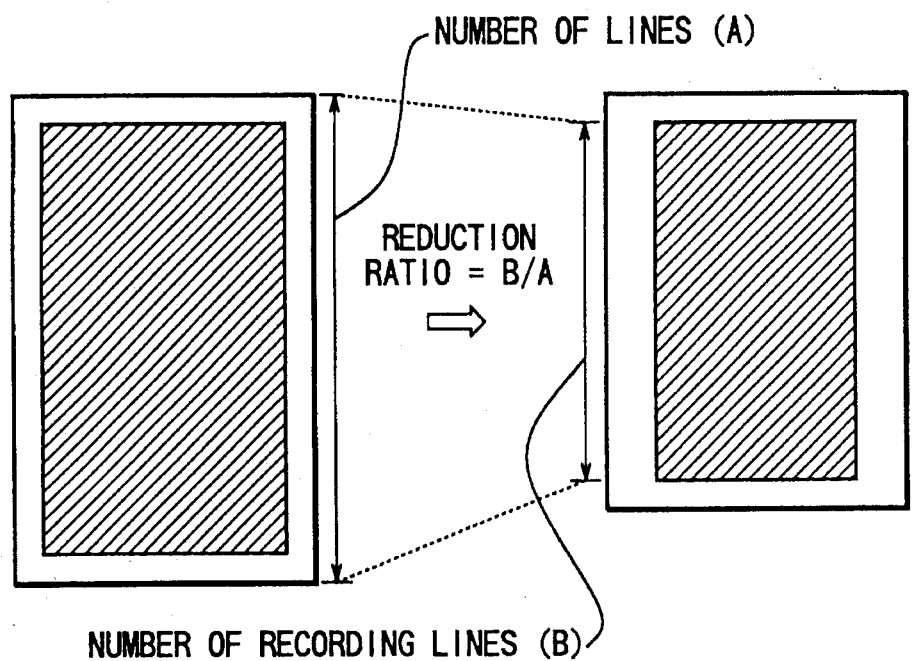
FIGS. 8(a) and 8(b) show the scale down printing by the conventional facsimile machines, respectively.
Figure 8B:
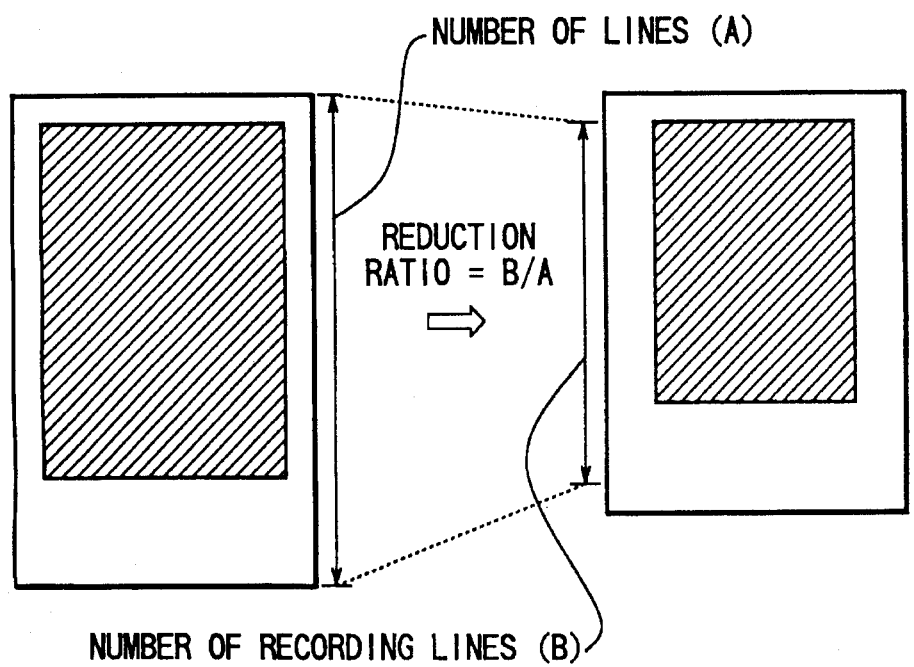

Next, the operation of the facsimile machine 1 having the above described structure will be explained with reference to the flow chart of FIG. 6. Here, the image data is already transmitted from another facsimile and stored in the image memory 14, before the "START" of the flow chart.

(i) The signal processor 10 resets the counting value of the line counter 11 (Step 100) and sets the counting values ($n_{min}$ and $n_{max}$), which are already stored in the RAM 17b, to zero, respectively (S101).

(ii) The signal processor 10 resets the counting value of the black pixel counter 12 (S102).

(iii) The signal processor 10 reads one line from the image data stored in the image memory 14 (S104) and increments the counting value n of the line counter 11 by one (S105).

(iv) After that, if the counting value B of the black pixel counter 12 is not smaller than the predetermined value E, the signal processor 10 returns to the operation of (ii) (S107). On the other hand, if the counting value B is equal to or greater than the predetermined value E (S107) and $n_{min}=0$ (S108), n is set to the value of $n_{min}$ (first image-carrying line or top effective line) and it is stored in the RAM 17b (S109). If the counting value B is equal to or greater than the predetermined value E (S107) and $n_{min}$ is not equal to zero (S108), n is set to the value of $n_{max}$ (last image-carrying line or bottom effective line) and it is stored in the RAM 17b (S110). Then, the signal processor 10 returns to the operation (ii). These operations are repeated for the image data of one page.

(v) Upon completing the processing of the image data of one page, the signal processor 10 receives an RTC signal (Return-To-Control signal) (S103) and an EOP signal (End-Of-Procedure signal) in turn (S111). Then, the signal processor 10 calculates the number of effective lines (DT) (DT=$n_{max}-n_{min}+1$) based on the data stored in the RAM 17b (S112) (see FIG. 2). (+1 may be changed to +2 or another value as desired.) If the number of the effective lines (DT) exceeds the number of recording lines of standard recording sheet (DR) which is stored in the ROM 17a beforehand, the signal processor 10 calculates the reduction ratio by dividing the value DR by the value DT (S114). Accordingly, the image data of one page is reduced by the image reducing device 13 (S115) and printed on the recording sheet by the printer 19 (S116). If the number of the effective lines DT does not exceed the number of recording lines DR, the image data of one page is printed in a full scale. In this way, the facsimile machine 1 carries out the data reception and printing operation. After the printing, the facsimile machine 1 is set to the stand-by state.

(vi) If the signal processor 10 receives a MPS signal (Multipage Signal) or an EOM signal (End Of Message signal) after the RTC signal (S117), the printing operation of (v) is carried out (S118–S122) and the program returns to Step 100 so as to execute the printing operation of image data of next page.

In the above explanation, the length of the top margin and bottom margin of the sending sheet (the image data is depicted between the top and bottom margins) are not considered in the printing operation. However, it may be possible that the lengths of top and bottom margins are respectively detected, and if the number of the effective lines of the sending sheet is smaller than that of recording lines of the recording sheet, the margin-to-non-margin ratio of the recording sheet is set to that of the recording sheet.

Figure 11:
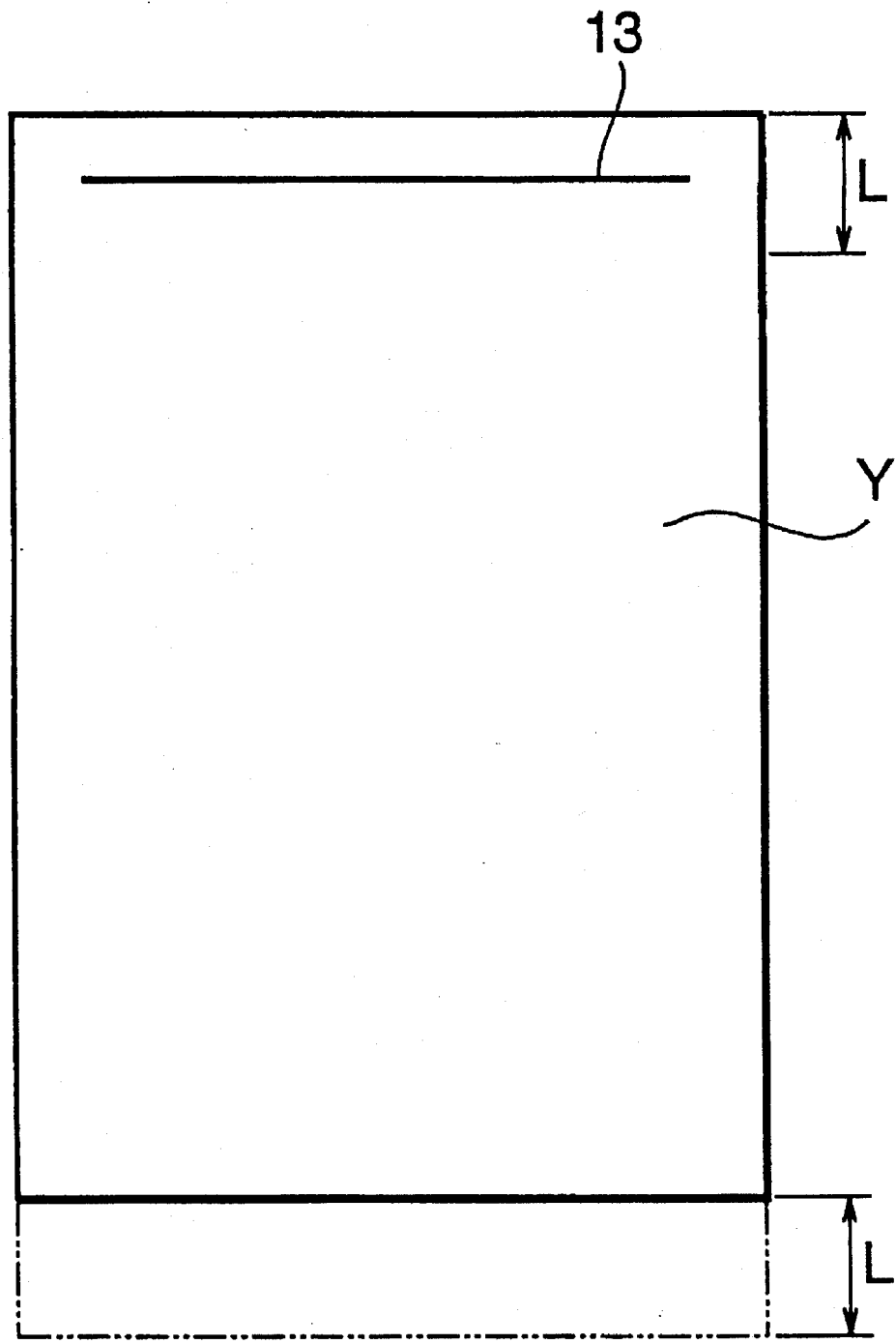
FIG. 11 depicts a recording sheet on which a piece of information of the sending party is printed.

Next, another embodiment of the present invention will be explained with reference to FIGS. 9–11.

FIG. 9 illustrates a circuitry of a facsimile machine according to the second embodiment of the present invention. A CPU (Central Processing Unit) 20 controls the facsimile machine on a program stored in a ROM (Read Only Memory) 21. The CPU 20 and ROM 21 constitute control means. A RAM (Random Access Memory) 22 stores various data such as data relating to image formation and facsimile numbers. An NCU (Network Control Unit) 23 controls the output and input of the data transmitted through a telephone line 24. A modem 25 modulates and demodulates the data. A coding and decoding circuit 26 decodes a coded data received by the facsimile machine and/or codes image data before it is transmitted from the facsimile machine. A buffer memory 27 stores the image data decoded by the coding/decoding circuit 26. In the buffer memory 27, the decoded image data is arranged as shown in FIG. 2. In other words, the data in the buffer memory 27 consists of plural lines of data. A black pixel detector 28, which constitutes black pixel detecting means in combination with the CPU 20, is comprised of a memory circuit. The black pixel detecting means detects a black pixel in the decoded image data and sets a flag in the black pixel detector 28 upon detecting the black pixel. An image reader 29 is means for reading the image drawn on the sending sheet. A printer 30 is means for printing on the recording sheet the image data received by facsimile machine. In this embodiment, a cut sheet of standard size is used as the recording sheet. A key unit 31 has various numeric keys to allow the operator to input, for example, a facsimile number.

In the illustrated embodiment, if the number of the lines of non-printed image data in one page stored in the buffer memory 27 is smaller than a predetermined value, any black pixels are not detected from the remaining lines of data by the black pixel detector 28 and the flag is not set, the CPU 20 stops the printer 30. The predetermined value is the same as the number of the lines that may be written on one page in this embodiment. Of course, the predetermined value may be increased or decreased as required.

Next, an operation of the facsimile machine will be explained.

During the data reception, the facsimile machine operates under the control of CPU 1, as shown in the flow chart of FIG. 10. Specifically, before the image data depicted on one sheet (sometimes referred to as "image data of one page") is received by the facsimile machine, the flag of the black pixel detector 28 is reset (Step S101) and the coded data corresponding to one line of the image data is decoded in the coding/decoding device 26 (Step S202). The decoded image data which corresponds to one line of the image data is sent to the buffer memory 27 from the black pixel detector 28 (Step S203). Then, it is judged whether or not a black pixel data exists in the image data (S204). If the black pixel data is detected, the flag is set (Step S205).

Next, it is judged if the number of the remaining lines of the image data, which are stored in the buffer memory and which are not printed yet, is not smaller than the predetermined value. If the number of the remaining lines is equal to or greater than the predetermined value, the CPU 20 activates the printer 30 so that the image data (arranged in lines) stored in the buffer memory 27 is printed on the recording sheet (Steps S206 and S209). On the other hand, if the number of the remaining lines is smaller than the predetermined value, it is judged whether or not the transmission of data of one page is completed, based on an input of page-ending signal sent from the other facsimile machine (S207). If the answer is negative, the program returns to Step S202 to repeat the above described operation (Steps S207 and S202–S206).

If the number of the remaining lines is smaller than the predetermined number when the printing of one page (on the receiving side) finishes, it is judged whether or not the flag is set by the black pixel detector 28 (Step 208). If the flag has not been set, i.e., if the image data drawn on the remaining lines of the sending sheet is all white, the CPU 1 stops the printer 30 to terminate the printing onto the recording sheet. This is the end of printing operation for the one-page sending sheet. On the other hand, if the flag is set, i.e., if there is at least one black pixel in the remaining lines, the CPU 20 activates the printer 30 to print the image data, which is stored in the buffer memory 27, on the recording sheet (Step 209). After that, it is judged if the printing of one-page sending sheet is completed (Step 210). This judgment is made based on the page-ending signal transmitted from the sending side facsimile machine. If the one-page printing is not completed yet, the program returns to step S202 to repeat the above described operations.

As described above, according to the facsimile machine of this embodiment, if the number of remaining lines of image data of one page is smaller than the predetermined value and any black pixels are not detected, the printer 30 is not activated and the recording sheet is no longer picked up from a paper tray. Therefore, if two sheets of paper are necessary on the receiving side to print all the image data transmitted from the other facsimile machine together with various pieces of information such as name, date and time, the facsimile machine of the present invention does not always use two sheets of paper. Specifically, if nothing will be drawn on the second sheet, i.e., if all the image data to be printed on the second sheet is the white pixel data, the second sheet is not fed for the printing. Accordingly, the recording sheets are saved.

It should be noted here that even if the black pixel is not detected, the recording sheet is picked up from the paper tray, as long as the number of the remaining lines of the image data stored in the buffer memory 27 is equal to or larger than the predetermined value. This is because even if no black pixel is detected, the sending party intends to transmit certain image data in one case (i.e., the document is set into the sending facsimile machine upside down) and the sending party transmits a blank sheet by mistake in another case. In these cases, the facsimile machine on the receiving side informs the receiving party of the erroneous transmission by showing the blank sheet to the receiving party. The operator on the receiving side sees the blank recording sheet and may call the sending party to ask for the retransmission.

The present invention is not limited to the above described embodiment and various changes and modifications may be made without departing from the spirit and scope of the present invention. For example, the black pixel detector 28 may be incorporated in the coding/decoding circuit 26 and the coded black pixel data may be detected prior to the decoding.

Another embodiment will be explained with reference to FIGS. 12–14.

Figure 12:
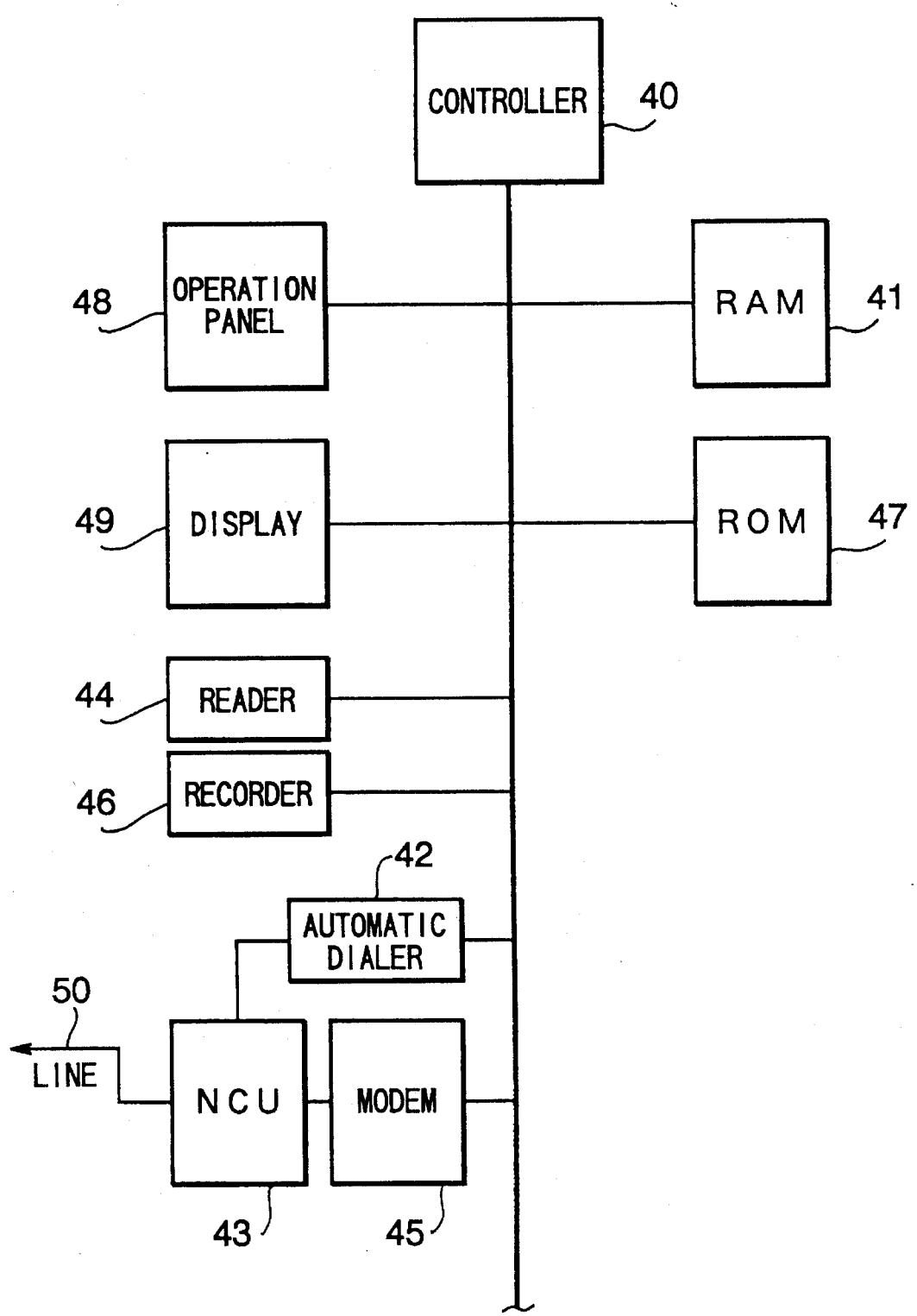
FIG. 12 depicts a block diagram of a facsimile machine according to a third embodiment of the present invention.

FIG. 12 illustrates a block diagram showing a schematic circuitry of a facsimile machine according to the present invention. The facsimile machine includes a controller 40, a RAM 41, an automatic dialer 42, an NCU 43, an image reader 44, a modem 45, a recorder 46, a ROM 47, an operation panel 48 and a display 49.

The controller 40 controls the overall operation of the facsimile machine on a control program stored in the ROM 47. A fundamental data sending operation will be explained below:

When an operator presses a transmission key (not shown) or a one-touch dialing key (not shown), the controller 40 reads a facsimile number of the other party stored in the RAM 41. With this facsimile number, the automatic dialer 42 and NCU 43 perform the dialing to call the other party through a telephone line 50. After the dialing, the image data read by the image reader 44 is transmitted to the other party from the modem 45 and NCU 43 through the telephone line 50.

On the other hand, the data reception is performed as follows:

When the information comes from the sending party via the telephone line 50, the NCU 43 and modem 45 detect the arrival of the information and the controller 40 activates the recorder 46 to record the information.

Figure 13:
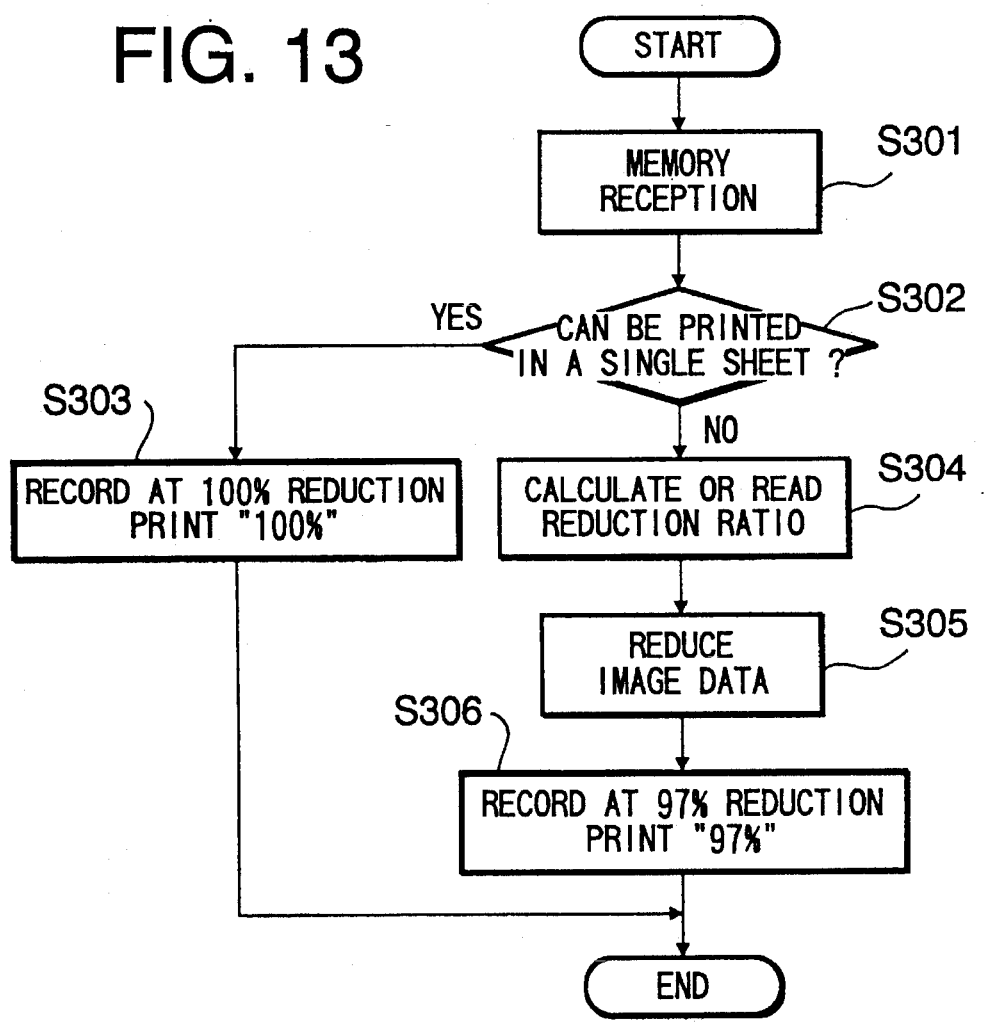
FIG. 13 depicts a flow chart of the facsimile machine of FIG. 12.
Figure 14A:
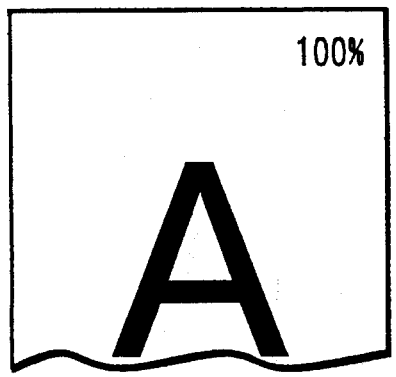
FIGS. 14(a) and 14(b) depict the recording sheets, respectively.
Figure 14B:
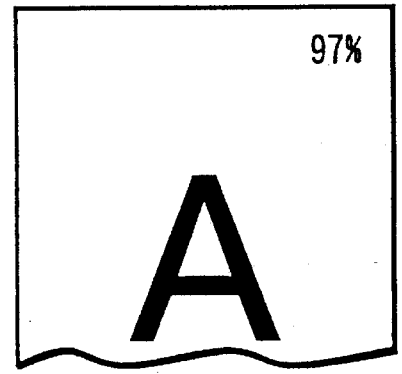

The controller 40 is also capable of performing following procedures during the data reception:

As illustrated in the flow chart of FIG. 13, the image data received is stored into the RAM 41 (S301). Then, it is judged if it is possible to print the information of image data stored in the RAM 41 on a certain region of the recording sheet of standard size or the same size as the sheet on the sending side (S302). The certain region is a region which excludes a 10 mm area from the top of the recording sheet. This certain region is referred to as an image recording area and the 10 mm area is referred to as an additional information recording area. If all the information can be printed in the image recording area, the additional information such as sending party's name, date and time of transmission is printed in the additional information recording area with a sign or indication of "100%" (S303), as shown in FIG. 14(*a*). "100%" means that the reduction ratio of the printing is 100%. Dot data necessary for a thermal head to print various numerals and signs such as % is stored in the RAM 41 and the controller 40 reads appropriate dot data from the RAM 41.

On the other hand, if the volume of the data is a little too large and all the data cannot be printed in the image recording area, the data is reduced such that all the data is printed in a single sheet. In this case, the reduction ratio is calculated or a predetermined reduction ratio is read out from the RAM 41 (S304), and the reduction is conducted with the reduction ratio of, for example, 97% (S305). Then, the printing of the reduced image data is performed. The reduction ratio "97%" is also printed in the additional information recording area together with other pieces of information such as sending party's name and date and time of transmission (S306).

According to this embodiment, since the reduction ratio is indicated in the additional information recording area of the recording sheet, the operator can easily see whether or not the scale down printing is performed and the reduction ratio if the data is reduced.

It should be noted that if tile volume of the data is too large, e. g., if data of two-page volume is sent from the sending party, the 50% scale down printing may be conducted to print such data in a single recording sheet. In other words, the reduction ratio is not limited to a value around 95% or 90. The reduction ratio(s) may be recorded in the recorder 46. In addition, generally the scale down printing is necessary when the cut sheets of standard size are used as the recording sheets, but the scale down printing may also be conducted when a roll of sheet is used. Further, the reduction ratios recorded may be printed on a receive confirmation report or an activity journal.

In this embodiment, the data is not reduced on the sending side but reduced on the receiving side. Therefore, the size of the data on the sending side is taken as 100%, and the reduction ratio of reduction at the receiving side is printed on the recording sheet. However, the data may be reduced on the sending side, for example at a reduction ratio of 80%, and then the reduced data is transmitted to the receiving side and another reduction at 97% may be performed on the receiving side. In this case, the total reduction ratio is 80%×97%=77.6%, and 77.6% is printed on the recording sheet.

Although the reduction ratio is indicated in the form of "97%" in this embodiment, it may be expressed by "X0.97".

We claim:

1. A facsimile machine, comprising:

means for receiving image data comprising a plurality of lines, printing means for printing at least one of the plurality of lines on at least one recording sheet, a buffer memory for storing the image data comprising a plurality of lines, means for determining whether the plurality of unprinted lines of image data stored in the buffer memory is not less than a predetermined value, means for activating the printing means to print all of the unprinted lines of image data stored in the buffer memory when the plurality of unprinted lines of image data stored in the buffer memory is not less than the predetermined value, means for determining whether one page has been completed when the plurality of unprinted lines of image data stored in the buffer memory is less than the predetermined value, means for determining whether at least one darkened pixel is present in the unprinted lines when the plurality of unprinted lines is less than the predetermined value and one page has been completed, means for deactivating the printing means when no darkened pixel is present in the unprinted lines when the plurality of unprinted lines is less than the predetermined value and one page has been completed, means for activating the printing means when at least one darkened pixel is present in the unprinted lines when the plurality of unprinted lines is less than the predetermined value and one page has been completed.

2. A facsimile machine, comprising:

means for receiving image data comprising a plurality of lines, at least one of the plurality of lines comprising at least one darkened pixel, printing means for printing at least one of the plurality of lines on at least one recording sheet, a buffer memory for storing the image data comprising a plurality of lines, means for determining whether the plurality of unprinted lines of image data stored in the buffer memory is not less than a predetermined value, means for activating the printing means to print all of the unprinted lines of image data stored in the buffer memory when the plurality of unprinted lines of image data stored in the buffer memory is not less than the predetermined value, means for determining whether one page has been completed when the plurality of unprinted lines of image data stored in the buffer memory is less than the predetermined value, means for determining whether at least one darkened pixel is present in the unprinted lines when the plurality of unprinted lines is less than the predetermined value and one page has been completed, means for deactivating the printing means when no darkened pixel is present in the unprinted lines when the plurality of unprinted lines is less than the predetermined value and one page has been completed, means for activating the printing means when at least one darkened pixel is present in the unprinted lines when the plurality of unprinted lines is less than the predetermined value and one page has been completed.

3. The facsimile machine of claim 1, comprising means for selecting the predetermined value.

4. The facsimile machine of claim 2, comprising means for selecting the predetermined value.

5. The facsimile machine of claim 3, wherein the printing means comprises means for printing blank pixels on the recording sheet for each of the plurality of lines that does not include a darkened pixel when the plurality of unprinted lines of image data stored in the buffer memory is not less than the predetermined value.

6. The facsimile machine of claim 4, wherein the printing means comprises means for printing blank pixels on the recording sheet for each of the plurality of lines that does not include a darkened pixel when the plurality of unprinted lines of image data stored in the buffer memory is not less than the predetermined value.

* * * * *